UNITED STATES PATENT OFFICE.

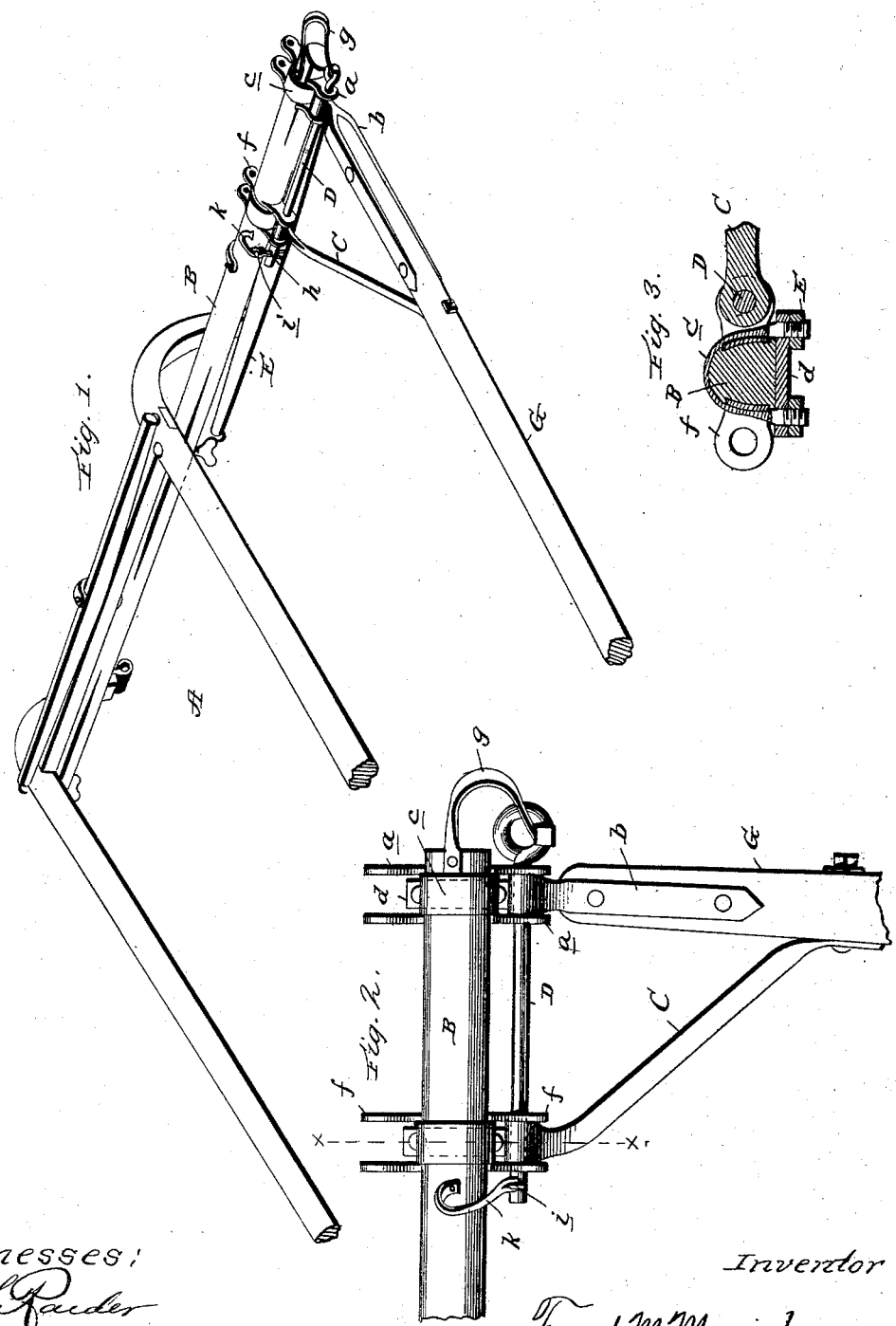

FRANK M. MERRICK, OF ATTICA, INDIANA.

SHAFT ATTACHMENT FOR VEHICLES.

SPECIFICATION forming part of Letters Patent No. 483,568, dated October 4, 1892.

Application filed May 2, 1892. Serial No. 431,517. (No model.)

*To all whom it may concern:*

Be it known that I, FRANK M. MERRICK, a citizen of the United States, residing at Attica, in the county of Fountain and State of Indiana, have invented certain new and useful Improvements in Colt-Breaking Devices; and I do declare the following to be a full, clear, and exact description of the invention, such as will enable others skilled in the art to which it appertains to make and use the same.

This invention relates to a colt-breaking device; and it has for its object to provide a device for breaking a colt, which may be attached to any ordinary cart or sulky without altering its construction in any manner whatever.

Other objects and advantages will appear from the following description and claims when taken in connection with the annexed drawings, in which—

Figure 1 is a perspective view of a portion of a pair of ordinary shafts with my improvements applied. Fig. 2 is an enlarged plan view of my improved device with the extension-bar and shaft partly broken away, and Fig. 3 is a sectional view taken in the plane indicated by the dotted line $x$ $x$ of Fig. 2.

Referring by letter to said drawings, A indicates a pair of shafts, which may be of any ordinary or approved construction—such, for instance, as the shafts of a sulky or road-cart.

B indicates an extensible bar or cross-bar. This bar B is designed to be attached at one end to the shafts or their cross-bar and extend a sufficient distance from one side thereof, as shown. This cross-bar is preferably secured to the shafts or cross-bar thereof by such means as will permit of its ready attachment and removal, so that when it is desirable to use the cart without the attachment said attachment may be quickly removed. This bar B may be secured to the shafts by passing it through loops depending from the shafts or their cross-bar and securing it therein by suitable fastening devices, or the bar may carry set-screws to take into screw-tapped apertures in the shafts; but I do not wish to limit myself to any manner of securing the bar to the shafts, as it is obvious that there are many ways in which the bar can be secured without departing from the spirit of my invention. This bar is provided at one end on its forward side with a shackle $a$, designed to receive the thill-iron $b$, and its branches have eyes to coincide with the eye in the thill-iron, so as to receive a pin or bolt for connecting the two in a hinged manner. The opposite side of this bar B is also provided with a similar shackle and both are secured to the opposite sides of the bar by means of a clip C and a plate D and nuts E or other suitable devices, so that the shaft or thill may be secured to either side of the bar B, and thus adapt the bar for use upon either side of the shafts. I would have it understood, however, that I do not wish to limit myself to arranging these shackles on both sides of the bar.

For the sake of strength and durability I design providing the bar B at a suitable distance from the shackles $a$ with similar shackles $f$ and provide the thill or shaft with a brace C, having an eye at its free end to enter between the branches of one of the shackles $f$ and receive the long bolt D, which passes through the respective eyes, as shown, and this bolt may be attached to the end of the bar by means of a chain or strap $g$. The bolt is provided at its opposite end with a hole $h$, and a key or cotter-pin $i$, attached to the bar B by means of a chain or strap $k$, is inserted in the eye at the inner end of the pin or bolt, so as to hold the same in position. The laterally-extended part of the bar B is provided with a whiffletree F, and, although I have shown it on the under side of said bar, it is obvious that it may be arranged on the upper side thereof.

From the construction described it will be seen that my improved device can be made to work on either side, as is sometimes desirable in breaking a colt for harness.

In operation I first hitch a good gentle horse in the shafts in the usual way, using the dam of the colt if possible. I then harness the colt and tie it to the adjacent shaft of the cart, being careful not to tie him too short, I then place the shaft G in the loop of the saddle and apply the breeching-straps in the usual manner, when the colt is ready for driving.

Having described my invention, what I claim is—

1. A bar adapted to be secured to the shafts of a cart or sulky so as to extend laterally therefrom, in combination with a shaft or thill connected with one end of said bar, whereby a colt may be harnessed at the side of the shafts of an ordinary cart or sulky, substantially as specified.

2. The combination, with the shafts of a cart or a sulky, of a cross-bar, suitable means for securing said bar to the shafts so as to extend on one side thereof, and a shaft or thill connected to the outer end of said bar, substantially as specified.

3. A bar adapted to be secured to the shafts of a cart or sulky so as to extend laterally therefrom and also having its extended end provided on opposite sides with a shackle for the attachment of a shaft or thill, substantially as specified.

4. The laterally-extensible bar having the shackles on opposite sides at one end, in combination with the shaft, the bolt for connecting the shaft to the shackles, and the pin or key for securing the bolt in position, substantially as specified.

In testimony whereof I affix my signature in presence of two witnesses.

FRANK M. MERRICK.

Witnesses:
ALBERT SCHOONOVER,
H. C. MARTIN.